United States Patent
Hamilton, II et al.

(10) Patent No.: US 7,313,796 B2
(45) Date of Patent: Dec. 25, 2007

(54) RECIPROCITY AND STABILIZATION IN DYNAMIC RESOURCE REALLOCATION AMONG LOGICALLY PARTITIONED SYSTEMS

(75) Inventors: Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 10/455,182

(22) Filed: Jun. 5, 2003

(65) Prior Publication Data

US 2004/0250250 A1    Dec. 9, 2004

(51) Int. Cl.
*G06F 9/455*    (2006.01)
*G06F 9/46*    (2006.01)

(52) U.S. Cl. .................... 718/104; 718/1; 718/105
(58) Field of Classification Search .............. 718/104
See application file for complete search history.

(56) References Cited

U.S. PATENT DOCUMENTS

| | | | |
|---|---|---|---|
| 4,603,382 A | 7/1986 | Cole et al. | 364/200 |
| 5,504,670 A | 4/1996 | Barth et al. | 364/134 |
| 5,875,464 A | 2/1999 | Kirk | 711/129 |
| 5,889,989 A | 3/1999 | Robertazzi et al. | 395/675 |
| 5,978,583 A | 11/1999 | Ekanadham et al. | 395/703 |
| 6,199,075 B1 | 3/2001 | Ungar et al. | 707/206 |
| 6,321,373 B1 | 11/2001 | Ekanadham et al. | 717/1 |
| 6,327,587 B1 | 12/2001 | Forster | 707/2 |
| 6,366,945 B1 | 4/2002 | Fong et al. | 709/104 |
| 6,378,039 B1 | 4/2002 | Obara et al. | 711/114 |
| 2002/0178337 A1 | 11/2002 | Wilson et al. | 711/173 |
| 2003/0005215 A1 | 1/2003 | Arimilli et al. | 711/105 |

*Primary Examiner*—Meng-Ai T. An
*Assistant Examiner*—Eric C Wai
(74) *Attorney, Agent, or Firm*—David A. Mims, Jr.; Rudolf O. Siegesmund; Gordon & Rees, LLP (57) ABSTRACT

A method and system for achieving stability while reallocating resources in a logically partitioned environment. The present invention comprises Performance Enhancement Program (PEP), Classification Program (CP), System Analysis Program (SAP), and System Evaluation Program (SEP). PEP allows a user to enter several performance parameters. CP classifies each of the virtual systems in the managed system based on their workload. SAP analyses the managed system to determine the configuration of the managed system. Managed systems configurations are classified according to the reciprocity of resource allocation and the overall symmetry of the managed systems. SEP evaluates the configuration of the managed system and recommends alterations for improved performance of the managed system. The managed system will be optimized when the functional differentiator (FD) of the virtual systems is small enough to allow reallocation of resources without an unacceptable sacrifice in managed system stability.

25 Claims, 6 Drawing Sheets

RECIPROCITY AND STABILIZATION IN DYNAMIC RESOURCE REALLOCATION AMONG LOGICALLY PARTITIONED SYSTEMS

FIELD OF THE INVENTION

The present invention is related generally to a method for increasing computer system efficiency and specifically to a computer program for optimizing resource reallocation in a logically partitioned environment.

BACKGROUND OF THE INVENTION

A computer system is a collection of computer resources, such as processors, adapters, memory and the like, which work together to perform a specific task, and is well known in the art. The computer system may be located in a single computer, such as a server, or in a plurality of computers, such as computer network. System administrators (hereinafter, administrators) are people who setup and manage computer systems. One of the tools used by administrators to increase the performance of a computer system is physical partitioning. Administrators physically partition a managed system by dedicating buses and predefined physical modules within the system to assist in creating the smaller partitioned systems, referred to as virtual systems. Each virtual system in a managed system appears to the end user as a completely separate system. In addition, virtual systems improve administrative flexibility and application performance.

A method used by administrators to increase system performance in a managed system is logical partitioning. Logical partitioning is a process which creates logical partitions within the managed system. Logical partitioning is distinct from physical partitioning in that there are no physically separated buses, memory, or processors in a logically partitioned system. Instead, the virtual systems are separated only by the system software. Similar to the physically partitioned system, each individual virtual system created by logical partitioning appears to the end user as a completely separate system. One advantage of logical partitioning is that logical partitioning permits much finer granularity in virtual system creation, such that any processor, memory, or adapter may be easily added or removed from a virtual system. Logical partitioning is generally controlled by a hardware management console outside of the managed system. The hardware management console controls the division of the managed system into the virtual systems and, if necessary, the reallocation of resources within the various virtual systems comprising the logically portioned environment.

When the reallocation occurs without having to reboot the managed system, the logical partitioning is known as dynamic logical partitioning. The prior art methods of dynamic reallocation require the system administrator to recognize the need for reallocation, and then to manually reallocate the resources. For example, in a system comprising a first virtual system having eight central processing units (CPUs) and a second virtual system having eight CPUs, the system administrator may observe that during a peak processing period, the first virtual system is running at 100% CPU utilization and the second virtual system is running at 20% CPU utilization. Upon observing the disparity in CPU utilization, the administrator may manually move one or more processors from the second virtual system to the first virtual system to improve system performance during the peak processing period. Therefore, a need exists for a system and method to automate the control and movement of resources in a dynamic logical partitioning environment.

The prior art methods of dynamic reallocation require the system administrator to decide which donors to take resources from and which recipients to give resources to and then to implement the decision by manually moving resources. The decision on what resources to move can be particularly difficult when there is only one donor and a plurality of recipients or there is only one recipient and a plurality of donors. The administrator may inadvertently create virtual systems with demands so high that the system never donates any resources. Likewise, an administrator may inadvertently create virtual systems with requirements so low that they never receive any resources. In addition, the priority of a virtual system may dictate that it must have a high demand (if a high priority system) or a low requirement (if a low priority system). However, it is generally not considered preferable for a managed system to contain donor-only or recipient-only virtual systems because resources will either gravitate towards or away from these systems and the administrator will have to make continued decisions and manual resource reassignments. Therefore, a need exists for a method of determining whether a managed system has donor-only or recipient-only virtual systems and identifying methods for eliminating donor-only and recipient-only virtual systems.

Another way in which the administrator may have to make continued decisions is when the administrator inadvertently creates a cyclical reallocation condition known as managed system instability. For example, in a managed system containing two virtual systems, the administrator may identify that the first virtual system is heavily loaded while the second virtual system is not. Resources are then transferred from the second virtual system to the first virtual system. The reduction in resources on the second virtual system increases the workload on the second virtual system, while the increase in resources on the first virtual system decreases the workload on the first virtual system. When the next resource reallocation cycle occurs and the need for resources at the second virtual system is recognized, the resources are transferred from the first virtual system back to the second virtual system. The process of resource reallocation from one virtual system to another may cycle back and forth indefinitely if the administrator does not recognize the cyclic nature of the reallocation.

When the administrator has to make too many decisions and reassignments, the overly frequent resource reallocation drives down the overall efficiency and performance, of the managed system because the resources spend more time in reallocation mode than in actual use. The administrator can decrease the amount of reallocation to increase the stability; however the decrease in resource reallocation may also lead to decreased efficiency and performance of the managed system. Consequently, a need exists for an apparatus and method of determining a proper balance between reciprocity and stabilization of resource reallocation amongst virtual systems in the logically partitioned environment of a managed system.

The need for automation within the reallocation process has been addressed by the prior art. U.S. Pat. No. 4,603,382 (the '382 patent) entitled "Dynamic Buffer Reallocation" discloses a method for dynamically reallocating data storage segments within a storage device. The '382 patent monitors the properties of the data storage device and reallocates the buffer segments when they exceed a predefined threshold. U.S. Pat. No. 5,875,464 (the '464 patent) entitled "Computer System with Private and Shared Partitions in Cache" discloses a partitioned cache memory buffer which monitors the allocation of tasks. The memory buffer of the '464 patent reallocates the tasks when necessary. U.S. Pat. No. 5,978,583 (the '583 patent) discloses a method of reallocating applications during the course of their execution. The method disclosed in the '583 patent monitors the applications and redistributes the applications when necessary based on various criteria. U.S. Pat. No. 6,366,945 (the '945 patent) entitled "Flexible Dynamic Partitioning of Resources in a Cluster Computing Environment" discloses a method for dynamic partitioning of a computer network. The method of the '945 patent monitors the resources within the virtual networks and moves resources among networks when required. However, the '945 patent does not disclose a method for dynamic logical partitioning of a managed network. Consequently, what is needed beyond the '382, '464, '583, and '945 patents is a method and system for dynamic logical partitioning of a managed system.

Therefore, a need exists for an efficient automated method to optimize the allocation of resources within a virtual system based on the ability of the donor systems to donate resources and the need of the recipient system to receive resources.

SUMMARY OF THE INVENTION

The invention, which meets the needs stated above, is a method and system for achieving stability while reallocating resources in a logically partitioned environment. The software embodiment of the present invention comprises a Performance Enhancement Program (PEP), a Classification Program (CP), a System Analysis Program (SAP), and a System Evaluation Program (SEP). For every resource class and subclass, PEP allows a user to enter a performance parameter, select a capture interval, select a sampling interval, define a donor load threshold, and define a recipient load threshold. PEP determines if a conditioning level is required and interfaces with CP, SAP, and SEP.

CP classifies each of the virtual systems in the managed system. The virtual systems are classified based on their previous or expected workload. The virtual systems are classified as either recipient-only (Ro), primarily recipient, but possibly donor (Rd), equally weighted as donor or recipient (RD), primarily donor, but possibly recipient (Dr), or donor-only (Do).

SAP analyses the managed system to determine the configuration of the managed system and whether a conditioning period is required. Managed systems configurations are classified according to the reciprocity of resource allocation and the overall symmetry of the managed systems. Possible managed system configurations include: fully reciprocal symmetric, fully reciprocal asymmetric, partially reciprocal symmetric and partially reciprocal asymmetric. The fully reciprocal asymmetric, partially reciprocal symmetric, and partially reciprocal asymmetric configurations do not require a conditioning period. The fully reciprocal symmetric configuration will only require a conditioning period when the managed system contains only RD systems.

SEP evaluates the configuration of the managed system and recommends alterations for improved performance of the managed system. SEP looks at the configuration of the managed system, and possibly the types of virtual systems contained within the managed system. SEP identifies the managed system configurations which do not allow for resource reallocation and recommends alterations for creating virtual systems which will be able to both donate and receive resources. SEP also identifies the managed system configurations which allow resource reallocation and recommends improvements when the amount of resource reallocation is suboptimal.

One of the devices used by SEP is the functional differentiator (FD). The FD is a measure of how readily a virtual system will switch from being a donor to a recipient, or vice-versa. A large FD is indicative of a stable system, but one that does not reallocate resources very well. A small FD is indicative of a system that readily reallocates resources, albeit at some sacrifice in managed system stability. The managed system will be optimized when the FD of the virtual systems is small enough to allow reallocation of resources without an unacceptable sacrifice in managed system stability.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "capture interval" means the interval at which statistics are collected on resource performance for various systems and may be any interval shorter than or equal to the sampling interval.

As used herein, the term "composite parameter" means the average of the resource data accumulated over the sampling interval. The average used to calculate the composite parameter may be the mean, median, mode, or norm. Smoothing criteria may optionally be used to determine the composite parameter. An example of smoothing would be removing the high and low values of the data collected during the sampling interval.

As used herein the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "conditioning interval" means the period during which sampling statistics may or may not be collected, but no resource allocation will be made upon any sampling statistics collected until completion of the conditioning interval.

As used herein, the term "controlling entity" means the computational device, either internal or external to the managed system, which manages the reallocation of resources. In a UNIX environment, this is known as the Hardware Management Console.

As used herein, the term "donor" means a system which has a composite parameter less than the donor load threshold.

As used herein, the term "donor candidate" means a system which is designated by a user as eligible to donate a resource to another system.

As used herein, the term "donor candidate pool" means the group of all donor candidates.

As used herein, the term "donor load threshold" means a specific performance parameter level below which a donor may provide a resource to a recipient.

As used herein, the term "donor pool" means the group of all donors.

As used herein, the term "functional differentiator" means the difference between the donor load threshold and the recipient load threshold for a particular system. For donor-only (Do) systems in which the recipient load threshold is infinite, a very large number, or undefined, the functional differentiator is infinite. For recipient-only (Ro) systems in which the donor load threshold is negative, zero, or undefined, the functional differentiator is also infinite.

As used herein, the term "managed system" means a collection of hardware resources which work together to accomplish a specific task. The resources may be located in a single computer or in a plurality of networked computers. The managed system is generally composed of a plurality of virtual systems, or simply systems.

As used herein, the term "performance parameter" means one or more parameters used to measure the workload on a resource. Performance parameters may include a combination of several individual performance parameters.

As used herein, the term "resource" means a hardware component of a computer. Examples of resources are processors, adapters, and memory.

As used herein, the term "recipient" means a system which has a composite parameter greater than the recipient load threshold.

As used herein, the term "recipient candidate" means a system which is designated by a user as eligible to receive a resource from another system.

As used herein, the term "recipient candidate pool" means the group of all recipient candidates.

As used herein the term "recipient pool" means the group of all recipients.

As used herein, the term "recipient load threshold" means a specific performance parameter level above which a recipient may receive a resource from a donor.

As used herein, the term "resource class" means a specific type of resource including without limitation processors, memory, adapters and any resource known to persons skilled in the art.

As used herein, the term "resource subclass" means a specific category of resource class. If the resource class is adapters, then examples of the resource subclasses would include: gigabit ethernet, 10/100 ethernet, fibre channel, ATM, and FDDI. Persons skilled in the art are aware of other resource subclasses.

As used herein, the term "sampling interval" means a moving or discrete window of time over which sample statistics are captured and which is equal to or greater than the capture interval. For example, if statistics are captured every five seconds for a five minute sampling interval, then sixty statistical samples would be available at the end of the sampling interval.

Figure 1:
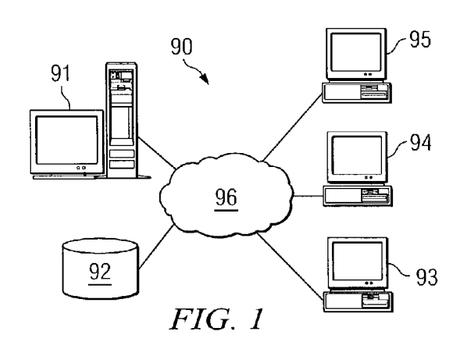
FIG. 1 is an illustration of a computer network used to implement the present invention.

FIG. 1 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network that may contain the present invention and is not meant as an architectural limitation.

Figure 2:
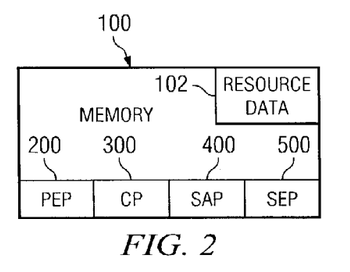
FIG. 2 is an illustration of the memory used to implement the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Performance Enhancement Program (PEP) 200. PEP 200 includes Classification Program (CP) 300, System Analysis Program (SAP) 400, and System Evaluation Program (SEP) 500. PEP 200, CP 300, SAP 400, and SEP 500 described herein can be stored within the memory of any computer depicted in FIG. 1. Alternatively, PEP 200, CP 300, SAP 400, and SEP 500 can be stored in an external storage device such as a removable disk or a CD-ROM. Memory 100 is illustrative of the memory within one of the computers of FIG. 1. Memory 100 also contains resource data 102. The present invention may interface with resource data 102 through memory 100. As part of the present invention, the memory 100 can be configured with PEP 200, CP 300, SAP 400, and/or SEP 500.

In alternative embodiments, PEP 200, CP 300, SAP 400, and/or SEP 500 can be stored in the memory of other computers. Storing PEP 200, CP 300, SAP 400, and/or SEP 500 in the memory of other computers allows the processor workload to be distributed across a plurality of processors instead of a single processor. Further configurations of PEP 200, CP 300, SAP 400, and/or SEP 500 across various memories are known by persons skilled in the art.

Figure 3:
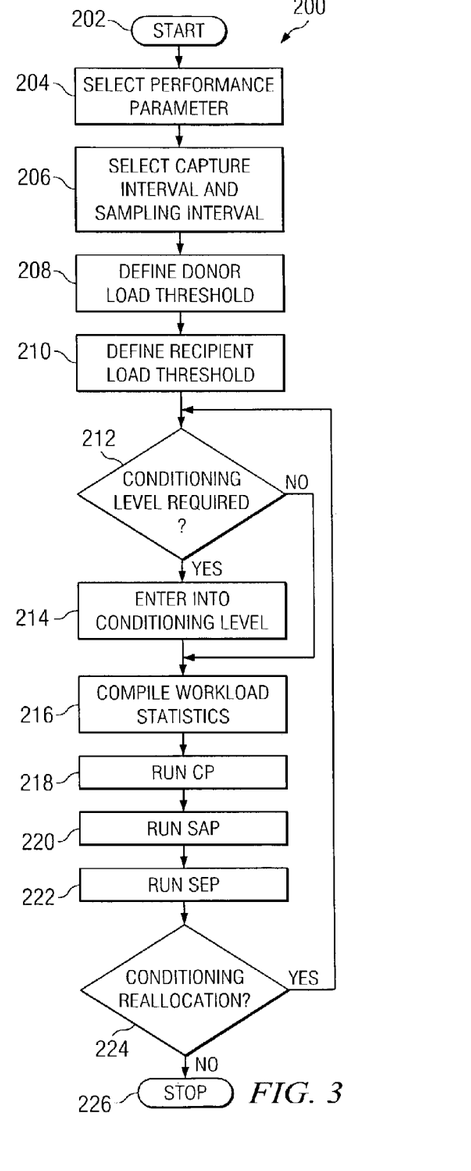
FIG. 3 is an illustration of the logic of the Performance Enhancement Program (PEP) of the present invention.

Turning to FIG. 3, a flowchart of the logic of PEP 200 is illustrated. PEP 200 is a program which allows the user to designate performance enhancement criteria and interfaces with the other programs of the present invention. The user described herein may be, for example, a system administrator. PEP 200 starts (202) and the user selects at least one performance parameter for each resource class, and if necessary subclass (204). The performance parameter is used by CP 300 to measure the workload on the resources. The user then defines the capture interval and the sampling interval (206). The capture interval and the sampling interval are used by CP 300 to develop resource data for resource reallocation.

The user then defines the donor load threshold (208). The donor load threshold is used by CP 300 to determine the classification of the systems within the managed system. A heavily loaded donor will not donate resources unless its threshold value is set very high. Generally, high priority systems should have low donor load thresholds, and low priority systems should have high donor load thresholds. The load threshold increases as system performance goes down, so that only a donor with a low load (i.e. relatively strong performance) may donate resources. The donor load threshold may be set to provide whatever degree of flexibility is desired by the user. For example, if the resource is a processor, and the performance parameter is the run queue, the performance parameter limit might be set at three waiting items in the run queue. Thus, when a processor has less than three items in the run queue, the processor will be identified as a potential donor.

The user then defines the recipient load threshold (210). The recipient load threshold is used by CP 300 to determine the classification of the systems. Generally, high priority systems should have low recipient load thresholds, and low priority systems should have high recipient load thresholds. A lightly loaded recipient will not receive resources unless its threshold value is set very low. As the load on the recipient system increases, the performance of the recipient system goes down, thus making the slow-running recipient candidate ripe for a resource addition. For example, if the resource is a processor, and the performance parameter is the run queue, the performance parameter limit might be set at four waiting items in the run queue. Thus, when a processor has more than four items in the run queue, the processor will be identified as a potential recipient.

PEP 200 then makes a determination whether a conditioning level is required (212). A conditioning level may be required by SAP 400 in step 422 (See FIG. 10), by the user, or if there is not any performance data on the systems. The length of the conditioning period is determined by the user. The user, being a person of ordinary skill in the art, will appreciate that increased conditioning periods allow for greater amounts of resource data to be collected for the virtual systems, while shorter conditioning periods will lead to smaller amounts of resource data. Similarly, greater conditioning periods will also lead to less resource reallocation, while shorter conditioning periods will lead to increased resource reallocation. If a conditioning level is not required, PEP 200 proceeds to step 216. If a conditioning level is required, PEP 200 enters into a conditioning level (214). During the conditioning level, the resource reallocation is temporarily suspended between the donors and the recipients. PEP 200 then compiles the workload statistics for the resources in the donor pool and in the recipient pool (216). If the PEP 200 entered the conditioning period in step 214, then there may be some overlap between the data in the workload statistics and the data obtained in the conditioning period. PEP 200 then runs CP 300 (218), SAP 400 (220), and SEP 500 (222). PEP 200 then makes a determination whether to continue the resource reallocation (224). If the user wants to continue resource reallocation, PEP 200 returns to step 212. If the user does not want to continue resource reallocation, PEP 200 ends (226).

In order to stabilize resource reallocation, the virtual systems within the managed system are classified by CP 300 according to their readiness to donate and receive resources. Once the virtual systems have been classified, SEP 400 can classify the managed system configuration, and SAP 500 can recommend improvements in the managed system configuration.

Figure 4:
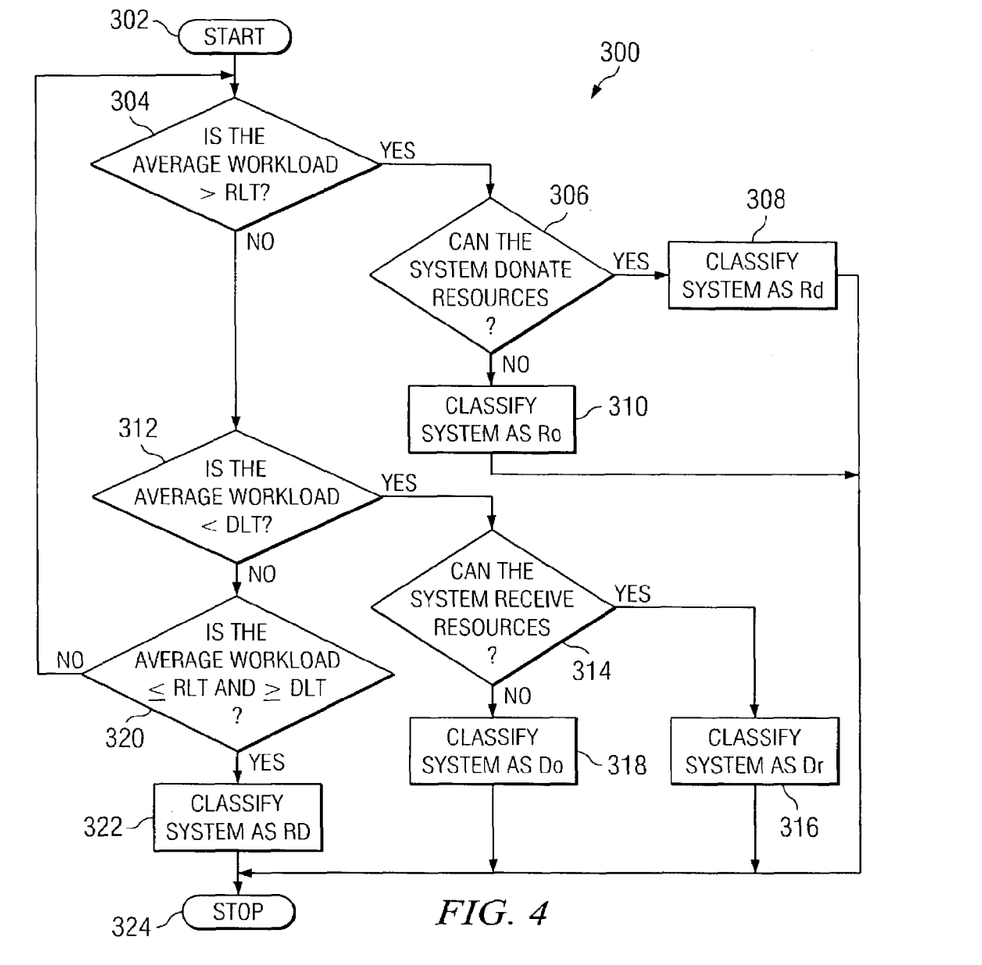
FIG. 4 is an illustration of the logic of the Classification Program (CP) of the present invention.
Figure 5:
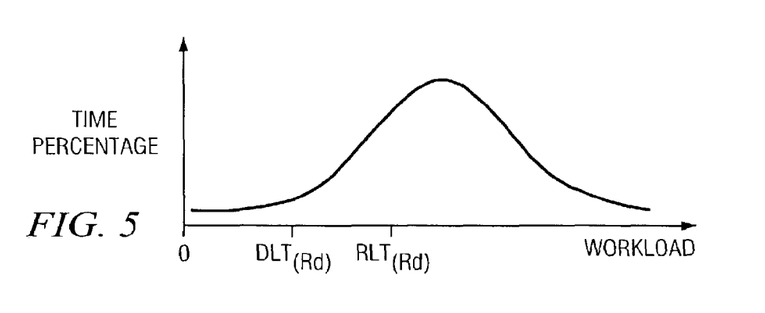
FIG. 5 is an illustration of the workload distribution of an Rd classified system.

FIG. 4 is a flowchart illustrating the logic of CP 300. CP 300 is a program which classifies the virtual systems within the managed system. CP 300 starts (302) when prompted by PEP 200. CP 300 then analyzes the workload statistics from each system obtained in step 216 of PEP 200 and makes a determination whether the average workload is greater than the recipient load threshold (304). If the average workload is not greater than the recipient load threshold, then CP 300 proceeds to step 312. If the average workload is greater than the recipient load threshold, then CP 300 makes a determination whether the system can donate resources (306). A system will be able to donate resources if the system's donor load threshold is greater than zero. If the system can donate resources, CP 300 classifies the system as an Rd system (308) and ends (324). Rd is a shorthand notation for a system that is primarily a recipient, but possibly a donor. An example of the workload distribution of an Rd system can be seen in FIG. 5. In FIG. 5, the average workload distribution is greater than the recipient load threshold and the donor load threshold is greater than zero.

Figure 6:
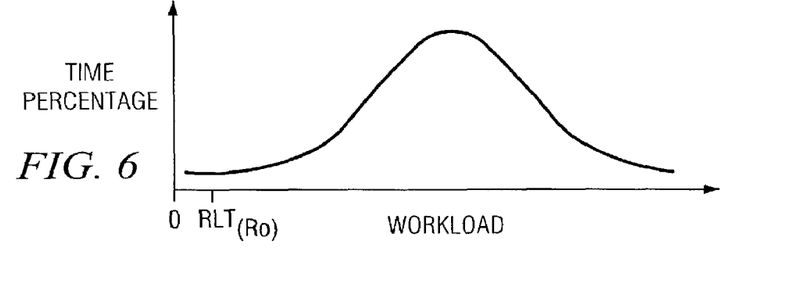
FIG. 6 is an illustration of the workload distribution of a Ro classified system.

Returning to step 306 in FIG. 4, if CP 300 makes a determination that the system cannot donate resources, then CP 300 classifies that system as a Ro system (310) and ends (324). A system will not be able to donate resources if the system's donor load threshold is either negative or undefined. Ro is a shorthand notation for a system that is only capable of being a recipient and cannot possibly be a donor. An example of the workload distribution of a Ro system can be seen in FIG. 6. In FIG. 6, the average workload distribution is greater than the recipient load threshold and the donor load threshold is undefined. The donor load threshold for a Ro system may be either negative or undefined.

Figure 7:
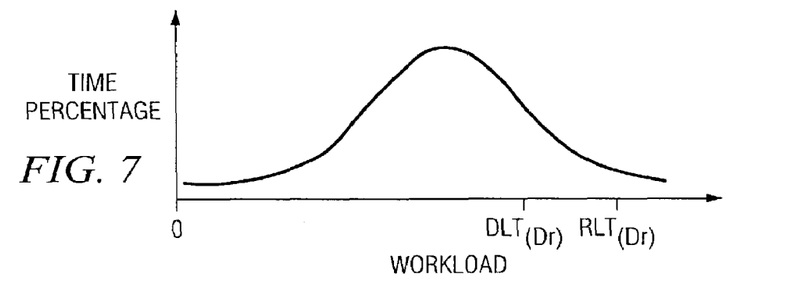
FIG. 7 is an illustration of the workload distribution of a Dr classified system.

At step 312 in FIG. 4, CP 300 makes a determination whether the average workload is less than the donor load threshold (312). If the average workload is not less than the donor load threshold, then CP 300 proceeds to step 320. If the average workload is less than the donor load threshold, then CP 300 makes a determination whether the system can receive resources (314). A system will be able to receive resources if the system's recipient load threshold is defined as less than infinity or a similar very large number. If the system can receive resources, CP 300 classifies the system as a Dr system (316) and ends (324). Dr is a shorthand notation for a system that is primarily a donor, but possibly a recipient. An example of the workload distribution of a Dr system can be seen in FIG. 7. In FIG. 7, the average workload distribution is less than the donor load threshold and the donor load threshold is less than infinity.

Figure 8:
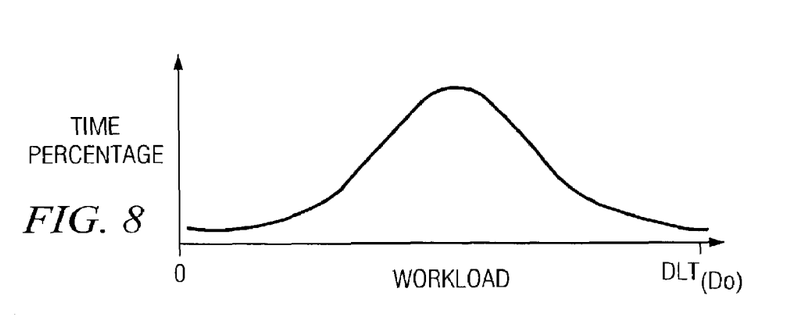
FIG. 8 is an illustration of the workload distribution of a Do classified system.

Returning to step 314 in FIG. 4, if CP 300 makes a determination that the system cannot receive resources, then CP 300 classifies that system as a Do system (318) and ends (324). A system will not be able to receive resources if the system's recipient load threshold is infinite, a very large number, or undefined. Do is a shorthand notation for a system that is only capable of being a donor and cannot possibly be a recipient. An example of the workload distribution of a Do system can be seen in FIG. 8. In FIG. 8, the average workload distribution is less than the donor load threshold and the recipient load threshold is undefined. The recipient load threshold for a Do system may be infinite, a very large number, or undefined.

Figure 9:
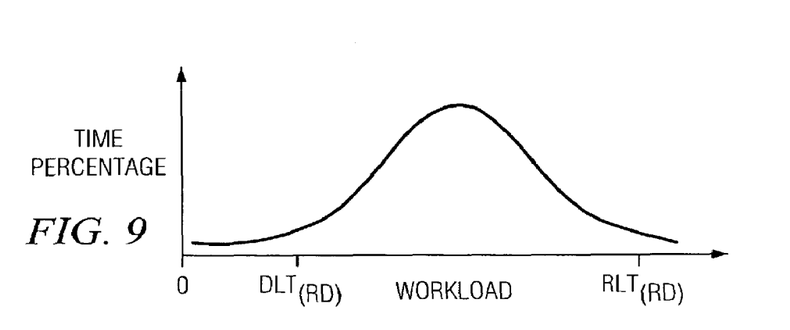
FIG. 9 is an illustration of the workload distribution of a RD classified system.

At step 320 in FIG. 4, CP 300 makes a determination whether the average workload is less than or equal to the recipient load threshold and greater than or equal to the donor load threshold (320). If the average workload is not less than or equal to the recipient load threshold or not greater than or equal to the donor load threshold, the CP 300 returns to step 304. If the average workload is less than or equal to the recipient load threshold and greater than or equal to the donor load threshold, then CP 300 classifies the system as a RD system (322) and ends (324). RD is a shorthand notation for a system that neither donates nor receives resources. An example of the workload distribution of a RD system can be seen in FIG. 9. In FIG. 9, the average workload distribution is greater than the donor load threshold and less than the recipient load threshold. If the difference between the donor load threshold and the recipient load threshold is large, then the RD system will be reluctant to donate or receive resources. If the difference between the donor load threshold and the recipient load threshold is small, the RD system will freely donate and receive resources.

After the virtual systems within the managed system have been classified, then the configuration of the managed system can be determined. A managed system can be either fully reciprocal or partially reciprocal. Full reciprocity means that all virtual systems can donate and receive resources to/from each other. In other words, a fully reciprocal managed system is one that does not have any Do or Ro virtual systems. Partial reciprocity means that there are one or more systems which cannot donate or receive resources. In other words, a partially reciprocal managed system is one that contains a Do system, a Ro system, or both. Fully reciprocal managed systems are more stable than partially reciprocal managed systems because resources tend to gravitate towards Ro systems and/or away from Do systems in a partially reciprocal managed system. This occurs because a Do system will donate resources, but never receive any and a Ro system will receive resources, but never donate any. Do systems may be preferable if there is a system where the priority of the applications is much lower than the priority of the other applications running on the managed system. Similarly, Ro systems may be preferable if there is a system where the priority of the applications is much higher than the priority of the other applications running on the managed system. Persons of ordinary skill in the art will appreciate that fully reciprocal configurations may be fully automated, while partially reciprocal configurations will require occasional manual reallocation of resource to/from the Do/Ro system(s).

Managed systems may also be classified according to their symmetry. Symmetry occurs when there is a both a Do and a Ro system, when there is both a Dr and an Rd system, or when there are only RD systems. Symmetric configurations are preferable to asymmetric configurations because symmetric configurations are more stable than asymmetric configurations. However, when designing and maintaining managed systems, the symmetry of the managed system is of lesser importance than the reciprocity of the managed system.

Figure 10:
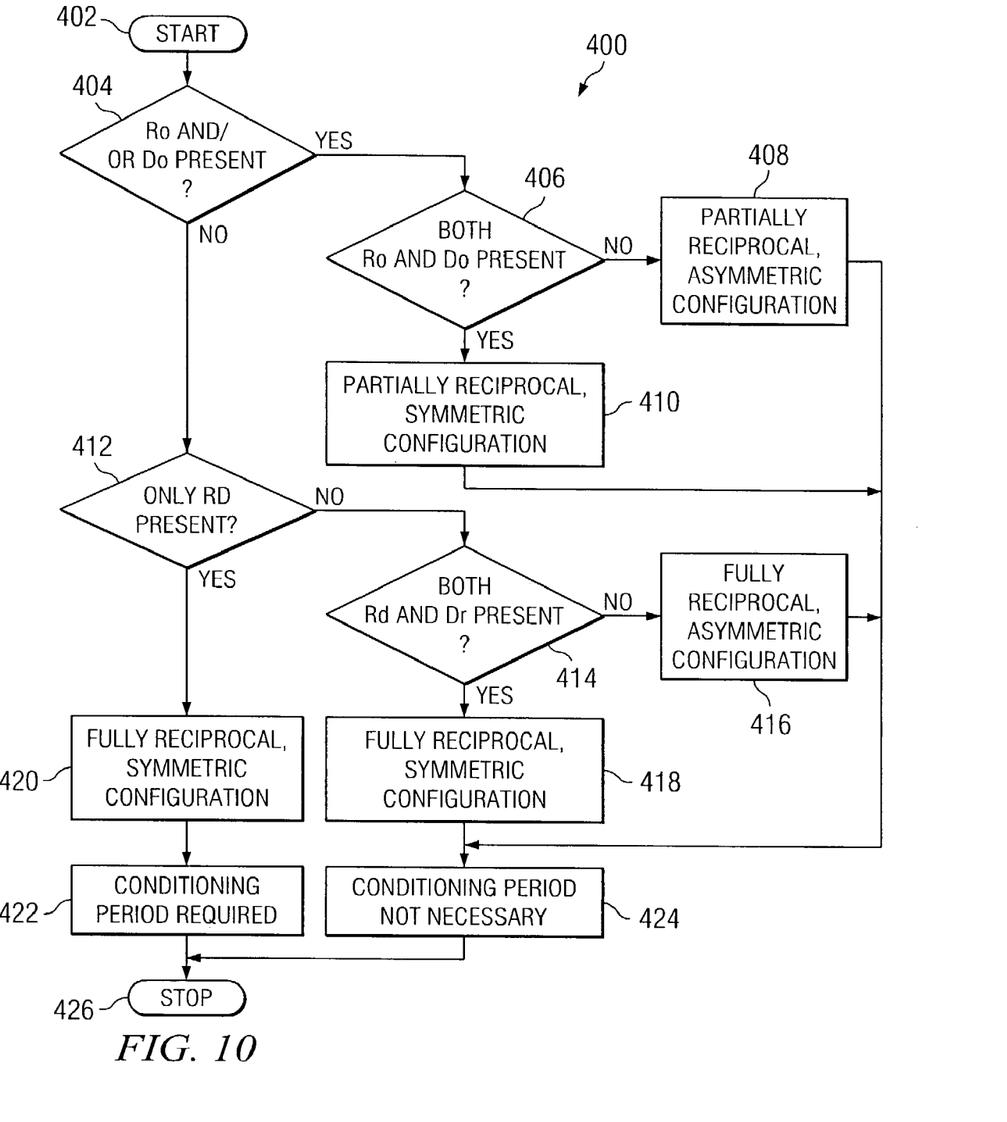
FIG. 10 is an illustration of the logic of the System Analysis Program (SAP) of the present invention.

Turning to FIG. 10, a flowchart of the logic of SAP 400 is illustrated. SAP 400 is a program which analyzes the managed system, determines the type of configuration, and determines whether reconfiguration is necessary. SAP 400 starts (402) when prompted by PEP 200. SAP 400 then makes a determination whether the managed system contains a Ro system and/or a Do system (404). If the managed system does not contain either a Ro system or a Do system, then SAP 400 proceeds to step 412. If the managed system contains a Ro system, a Do system, or both, then SAP 400 makes a determination whether both a Ro system and a Do system are present (406). If the managed system does not contain both a Ro system and a Do system, then SAP 400 classifies the managed system as a partially reciprocal asymmetric configuration (408). For a partially reciprocal asymmetric configuration, a conditioning period is not necessary (424), and SAP 400 ends (426). Returning to step 406, if SAP 400 makes a determination that the managed system does contain both a Ro system and a Do system, then SAP 400 classifies the managed system as a partially reciprocal symmetric configuration (410). For a partially reciprocal symmetric configuration, a conditioning period is not necessary (424), and SAP 400 ends (426).

At step 412, SAP 400 makes a determination whether the only systems present in the managed system are RD systems (412). If only RD systems exist in the managed system, then SAP 400 classifies the managed system as a fully reciprocal symmetric configuration (410). For a fully reciprocal symmetric configuration containing only RD systems, a conditioning period is necessary (422). A conditioning period is necessary to develop adequate workload statistics and prevent overly active resource reallocation. SAP 400 then ends (426). Returning to step 412, if SAP 400 makes a determination that the managed system does not contain only RD systems, then SAP 400 makes a determination whether both Rd and Dr are present (414). If both Rd and Dr are not present, then SAP 400 classifies the managed system as a fully reciprocal asymmetric configuration (416). For a fully reciprocal asymmetric configuration, a conditioning period is not necessary (424), and SAP 400 ends (426). Returning to step 414, if SAP 400 makes a determination that the managed system does contain both an Rd system and a Dr system, then SAP 400 classifies the managed system as a fully reciprocal symmetric configuration (418). For a fully reciprocal symmetric configuration containing both Rd and Dr systems, a conditioning period is not necessary (424), and SAP 400 ends (426).

The managed system can be described according to the types of systems contained in the managed system. For example, if a managed system contains some Rd systems, some RD systems, and some Dr systems, then the managed system can be described as an Rd-RD-Dr. If there are four configurations of managed systems (i.e. fully reciprocal asymmetric, fully reciprocal symmetric, partially reciprocal asymmetric, and partially reciprocal symmetric) and there are five types of systems (Ro, Rd, RD, Dr, and Do), then there are thirty-one possible combinations of managed systems, which may be described as follows:

TABLE 1

Possible managed system configurations

| Managed System Configuration | Number of Possible Combinations | Examples | Stability |
|---|---|---|---|
| Fully Reciprocal Symmetric | 3 | Rd-RD-Dr, Rd-Dr, RD | Most Stable |
| Fully Reciprocal Asymmetric | 4 | Rd-RD, RD-Dr, Rd, Dr | |
| Partially Reciprocal Symmetric | 4* | Ro-Rd-RD-Dr-Do, Ro-Rd-Dr-Do, Ro-RD-Do | ↓ |
| Partially Reciprocal Asymmetric | 20* | Rd-RD-Dr-Do, Ro-RD-Dr, Rd-Do, et al. | Least Stable |

*There are two partially reciprocal configurations that will result in no resource reallocation: Ro and Do. Ro-Do configurations reallocate resources so rapidly from the donor(s) to the recipient(s) that these managed systems are deemed to not reallocate resources. Several others such as Ro-Dr and Do-Rd configurations are highly unstable, and therefore not preferable.

Figure 11A:
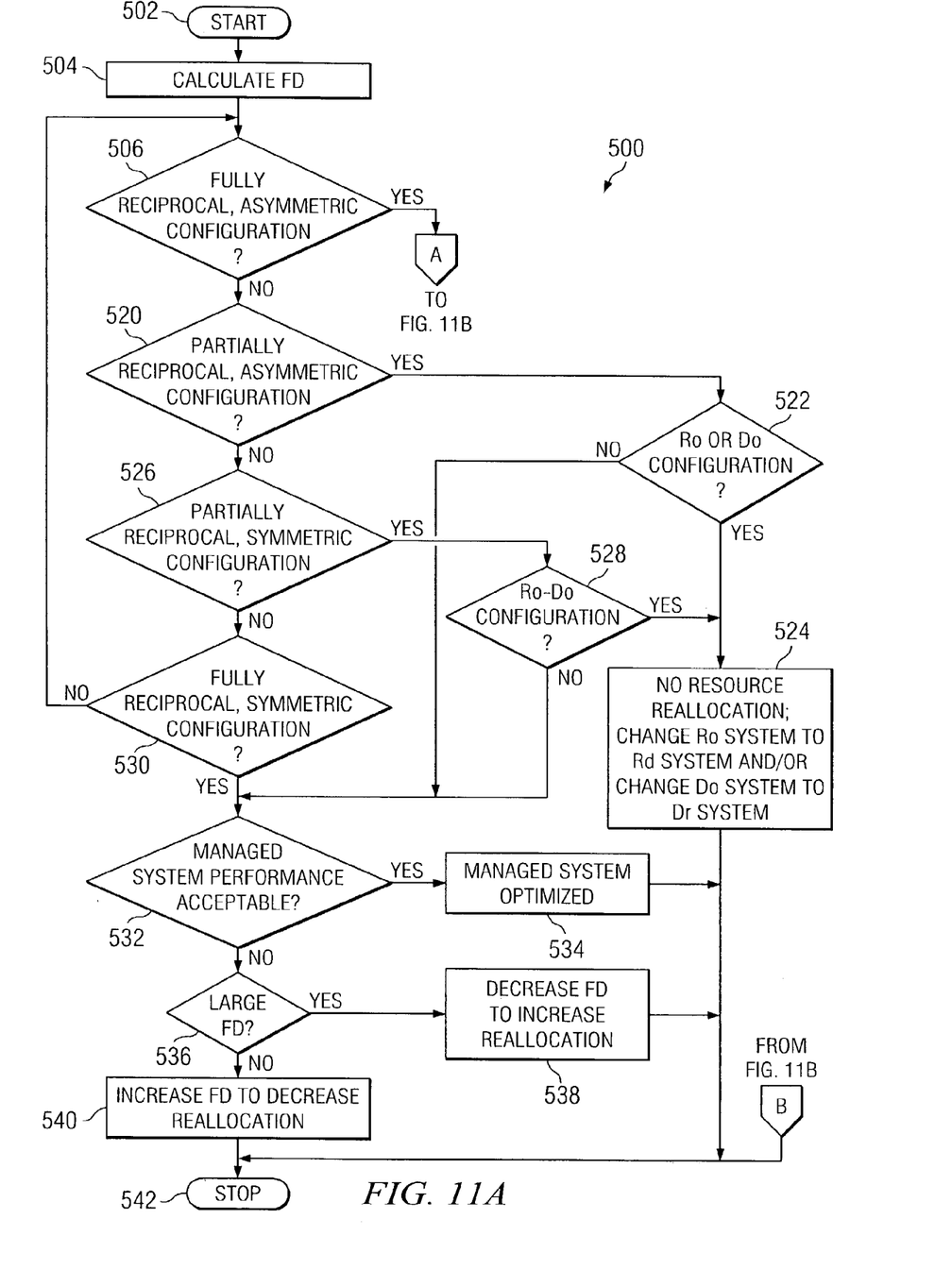
FIGS. 11A and 11B are an illustration of the logic of the System Evaluation Program (SEP) of the present invention.
Figure 11B:
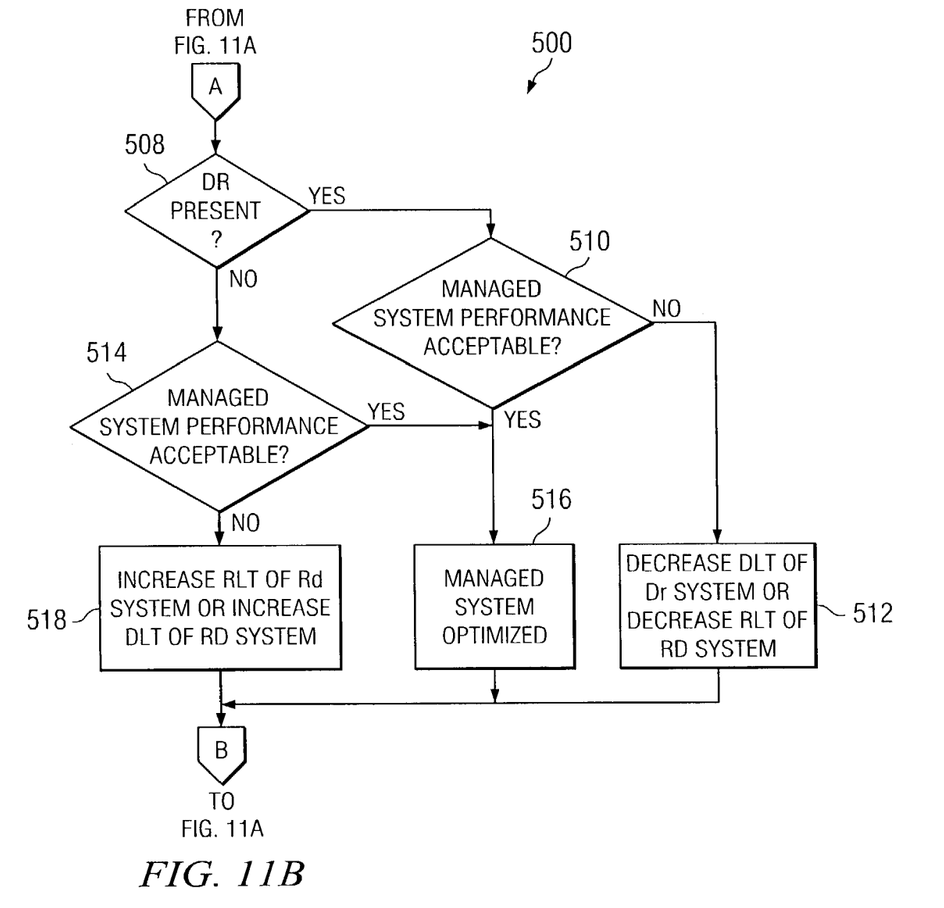

Turning to FIG. 11 (FIGS. 11A and 11B are jointly referred to as FIG. 11), a flowchart of the logic of SEP 500 is illustrated. SEP 500 is a program which evaluates the managed system configuration and recommends alterations for optimizing performance of the managed system. SEP 500 starts (502) when prompted by PEP 200. SEP 500 calculates the functional differentiator (FD) for each system in the managed system (504). SEP 500 then makes a determination whether the managed system is classified as a fully reciprocal asymmetric configuration (506). If the managed system is not classified as a fully reciprocal asymmetric configuration, then SEP 500 proceeds to step 520. If the managed system configuration is classified as a fully reciprocal asymmetric configuration, then SEP 500 makes a determination whether the managed system contains a Dr system (508). If the managed system does not contain a Dr system, then SEP 500 proceeds to step 514. If the managed system does contain a Dr system, then SEP 500 queries the user to make a determination whether the system performance is acceptable (510). In making the determination of the acceptability of the system performance, the user may consider the total number of resources reallocated, the level of performance of at least one resource class or subclass, the level of performance of at least one system, and/or the performance of the managed system as a whole. If the user determines that the system is performing acceptably, then SEP 500 indicates that the managed system is optimized (516) and ends (542).

Returning to step 510, if the user determines that the managed system is not performing acceptably, SEP 500 instructs the user to decrease the donor load threshold of at least one Dr system if the user wants to decrease resource reallocation, or decrease the recipient load threshold of at least one RD system if the user wants to increase resource reallocation (512). SEP 500 then ends (542).

At step 514, SEP 500 queries the user to make a determination whether the managed system performance is acceptable (514). If the user determines that the system is performing acceptably, then SEP 500 indicates that the managed system is optimized (516) and ends (542). Returning to step 514, if the user determines that the managed system is not performing acceptably, then SEP 500 instructs the user to increase the recipient load threshold of at least one Rd system if the user wants to decrease resource reallocation, or increase the donor load threshold of at least one RD system if the user wants to increase the resource reallocation (518). SPE 500 then ends (542).

At step 520, SEP 500 makes a determination whether the managed system is a partially reciprocal asymmetric configuration (520). If the managed system is not a partially reciprocal asymmetric configuration, then SEP 500 proceeds to step 526. If the managed system is a partially reciprocal asymmetric configuration, then SEP 500 makes a determination whether the managed system contains only Ro systems or only Do systems (522). If the managed system does not contain only Ro systems or only Do systems, then SEP 500 proceeds to step 532. If the managed system contains only Ro systems or only Do systems, then the managed system will not reallocate resources and SEP 500 instructs the user to change at least one Ro system to an Rd system and/or change at least one Do system to a Dr system (524). SEP 500 then ends (542).

At step 526, SEP 500 makes a determination whether the managed system is a partially reciprocal symmetric configuration (526). If the managed system is not a partially reciprocal symmetric configuration, then SEP 500 proceeds to step 530. If the managed system is a partially reciprocal symmetric configuration, then SEP 500 makes a determination whether the managed system is in a Ro-Do configuration (528). If the managed system is not in a Ro-Do configuration, then SEP 500 proceeds to step 532. If the managed system is a Ro-Do configuration, then the managed system is deemed not to reallocate resources and SEP 500 instructs the user to change at least one Ro system to an Rd system and/or change at least one Do system to a Dr system (524). SEP 500 then ends (542).

At step 530, SEP 500 determines whether the managed system configuration is a fully reciprocal symmetric configuration (530). If the managed system configuration is not a fully reciprocal symmetric configuration, then SEP 500 returns to step 506. If the managed system configuration is a fully reciprocal symmetric configuration, then SEP 500 queries the user to make a determination whether the managed system performance is acceptable (532). If the managed system is performing acceptably, then SEP 500 indicates that the managed system is optimized (534) and SEP 500 ends (542).

Returning to step 532, if the managed system is not performing acceptably, then SEP 500 makes a determination for each system whether the FD is large (536). Determining whether the FD is large is a complicated determination and the particular method for determining whether the FD is large is best left to the judgment of the particular user. For example, the user may determine that a FD that is larger than four standard deviations from the workload distribution is considered large. Alternatively, the user may choose a more fixed standard such as a FD of five or larger is to be considered large. Regardless of the standard used in step 536, if the FD is large, then SEP 500 instructs the user to decrease the FD of at least one system to increase the resource reallocation. The FD may be decreased by decreasing the recipient load threshold, increasing the donor load threshold, or both. The user will generally want to focus on decreasing the FD for the RD systems in order to achieve maximum resource reallocation and stability.

Returning to step 536, if the system does not contain a large FD, then SEP 500 instructs the user to increase the FD of at least one system to decrease the resource reallocation (540). The FD may be increased by increasing the recipient load threshold, decreasing the donor load threshold, or both. The user will generally want to focus on increasing the FD for the RD systems in order to achieve maximum resource reallocation and stability.

In an alternative embodiment, SEP 500 can perform determination steps 510, 514, 532, and/or 536 automatically, subject to performance parameter standards created by the user. Furthermore, SEP 500 can also perform readjustment steps 512, 518, 524, 538, and/or 540 automatically, subject to performance parameter standards created by the user. Persons of ordinary skill in the art are aware of methods for determining which system(s) should have their donor load thresholds or recipient load thresholds decreased within the managed system. Similarly, persons of ordinary skill in the art are aware of methods for determining which system(s) should have their recipient load thresholds or donor load thresholds increased within the managed system.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A computer implemented method for optimizing resource reallocation in a managed computer system comprising:

using a computer, classifying each of a plurality of virtual systems it the managed computer system as either recipient-only (Ro), primarily recipient, but possibly donor (Rd), equally weighted as donor or recipient (RD), primarily donor, but possibly recipient (Dr), or donor-only (Do);

determining the configuration of the managed system and calculating a functional differentiator for each of the plurality of virtual systems within the managed computer system by calculating a difference between a donor load threshold and a recipient load threshold for each of the plurality of virtual systems;

wherein a virtual system is classified as an Rd system when the average workload is greater than the recipient load threshold and the virtual system can donate a resource;

wherein the virtual system is classified as an Ro system when the average workload is greater than the recipient load threshold and the virtual system cannot donate a resource;

wherein the virtual system is classified as a Dr system when the average workload is less than the donor load threshold and the virtual system can donate a resource;

wherein the virtual system is classified as a Do system when the average workload is less than the donor load threshold and the virtual system cannot donate a resource;

wherein the virtual system is classified as a RD system when the average workload is less than or equal to the recipient load threshold and the average workload is greater than or equal to the donor load threshold;

wherein a configuration of the managed system is classified as a partially reciprocal symmetric system when the managed system contains both a Ro virtual system and a Do virtual system;

wherein the configuration of the managed system is classified as a partially reciprocal asymmetric system when the managed system contains a Ro virtual system or a Do virtual system, but not both;

wherein the configuration of the managed system is classified as a fully reciprocal symmetric system when the managed system contains only a RD virtual system;

wherein the configuration of the managed system is classified as a fully reciprocal symmetric system when the managed system contains both a Rd virtual system and a Dr virtual system;

wherein the configuration of the managed system is classified as fully reciprocal asymmetric system when the managed system contains both a Rd virtual system and a Dr virtual system;

wherein the functional differentiator measures how readily a virtual system will switch from a donor to a recipient, or vice versa; and wherein a first functional differentiator value range indicates a stable virtual system, but one that does not reallocate resources well, and a second functional differentiator value range indicates a system that readily reallocates resources, but at a sacrifice in a stability of the managed computer system;

wherein the managed computer system will be optimized when each of the plurality of virtual systems has a functional differentiator value in a third range that allows reallocation of resources without an unacceptable sacrifice in a managed system stability.

2. The computer implemented method of claim 1 wherein responsive to a determination that the managed system is partially reciprocal, determining whether the managed system is a Do, Ro, or Do-Ro configuration; wherein responsive to a determination that the managed system is a Do, Ro, or Do-Ro configuration, changing the Ro virtual system to a Rd virtual system.

3. The computer implemented method of claim 1 wherein responsive to a determination that the managed system is partially reciprocal, determining whether the managed system is a Do, Ro, or Do-Ro configuration; wherein responsive to a determination that the managed system is a Do, Ro, or Do-Ro configuration, changing the Do virtual system to a Dr virtual system.

4. The computer implemented method of claim 1 wherein responsive to a determination that the managed system is partially reciprocal, determining whether the managed system is a Do, Ro, or Do-Ro configuration; wherein responsive to a determination that the managed system is not a Do, Ro, or Do-Ro configuration, determining whether the managed system is performing acceptably.

5. The computer implemented method of claim 4 wherein responsive to a determination that the managed system is not performing acceptably, determining whether the functional differentiator of a virtual system is large; and responsive to a determination that the functional differentiator of a virtual system is large, decreasing the functional differentiator of the virtual system.

6. The computer implemented method of claim 4 wherein responsive to a determination that the managed system is not performing acceptably, determining whether the functional differentiator of a virtual system is large; and responsive to a determination that the functional differentiator of the virtual system is not large, increasing the functional differentiator of the virtual system.

7. The computer implemented method of claim 1 wherein the determination of the reciprocity includes a determination of the configuration of the managed system; wherein responsive to a determination that a managed system is a fully reciprocal symmetric configuration, determining whether the functional differentiator of a virtual system is large; and responsive to a determination that the functional differentiator of the virtual system is large, decreasing the functional differentiator of the virtual system.

8. The computer implemented method of claim 1 wherein the determination of the reciprocity includes a determination of the configuration of the managed system; wherein responsive to a determination that a managed system is a fully reciprocal symmetric configuration, determining whether the functional differentiator of a virtual system is large; and responsive to a determination that the functional differentiator of the virtual system is not large, increasing the functional differentiator of the virtual system.

9. The computer implemented method of claim 1 wherein the determination of the reciprocity includes a determination of the configuration of the managed system; wherein responsive to a determination that a managed system is a fully reciprocal asymmetric configuration, determining whether the managed system contains a Dr virtual system; and responsive to a determination that the virtual system contains a Dr virtual system and responsive to a determination that the managed system is not performing acceptably, decreasing the donor load threshold of the Dr system.

10. The computer implemented method of claim 1 wherein the determination of the reciprocity includes a determination of the configuration of the managed system; wherein responsive to a determination that a managed system is a fully reciprocal asymmetric configuration, determining whether the managed system contains a Dr virtual system; and responsive to a determination that the virtual system contains a Dr virtual system and responsive to a determination that the managed system is not performing acceptably, decreasing the recipient load threshold of a RD system.

11. The computer implemented method of claim 1 wherein the determination of the reciprocity includes a determination of the configuration of the managed system; wherein responsive to a determination that a managed system is a fully reciprocal asymmetric configuration, determining whether the managed system contains a Dr virtual system; and responsive to a determination that the virtual system does not contain a Dr virtual system and responsive to a determination that the managed system is not performing acceptably, increasing the recipient load threshold of a Rd system.

12. The computer implemented method of claim 1 wherein the determination of the reciprocity includes a determination of the configuration of the managed system; wherein responsive to a determination that a managed system is a fully reciprocal asymmetric configuration, determining whether the managed system contains a Dr virtual system; and responsive to a determination that the virtual system does not contain a Dr virtual system and responsive to a determination that the managed system is not performing acceptably, increasing the donor load threshold of a RD system.

13. A program product for causing a computer to optimize a dynamic logical partitioning of a managed computer system, through allocation of resources within a plurality of virtual systems in the managed computer system, and based on an ability of a donor system to donate resources and a need of a recipient system to receive resources, said program product comprising:
  a computer-usable medium;
  wherein said computer usable medium comprises a plurality of instructions encoded thereon comprising:
  instructions for classifying each of the plurality of virtual systems as either recipient-only (Ro), primarily recipient, but possibly donor (Rd), equally weighted as donor or recipient (RD), primarily donor, but possibly recipient (Dr), or donor-only (Do);
  instructions for calculating a functional differentiator for each of a plurality of virtual systems within the managed computer system by calculating a difference between a donor load threshold and a recipient load threshold for each of the plurality of virtual systems;
  instructions for determining the configuration of a managed system;
  wherein responsive to a determination that the managed system is fully reciprocal, determining whether the managed system is performing acceptably;
  wherein responsive to a determination that the managed system is performing acceptably, instructions for determining that the managed system is optimized;
  wherein the virtual system is classified as an Rd system when the average workload is greater than the recipient load threshold and the virtual system can donate a resource;
  wherein the virtual system is classified as an Ro system when the average workload is greater than the recipient load threshold and the virtual system cannot donate a resource;
  wherein the virtual system is classified as a Dr system when the average workload is less than the donor load threshold and the virtual system can donate a resource;
  wherein the virtual system is classified as a Do system when the average workload is less than the donor load threshold and the virtual system cannot donate a resource;
  wherein the virtual system is classified as a RD system when the average workload is less than or equal to the recipient load threshold and the average workload is greater than or equal to the donor load threshold;
  wherein the configuration of the managed system is classified as a partially reciprocal symmetric system when the managed system contains both a Ro virtual system and a Do virtual system;
  wherein the configuration of the managed system is classified as a partially reciprocal asymmetric system when the managed system contains a Ro virtual system or a Do virtual system, but not both;
  wherein the configuration of the managed system is classified as a fully reciprocal symmetric system when the managed system contains only a RD virtual system;
  wherein the configuration of the managed system is classified as a fully reciprocal symmetric system when the managed system contains both a Rd virtual system and a Dr virtual system;
  wherein the configuration of the managed system is classified as fully reciprocal asymmetric system when the managed system contains both a Rd virtual system and a Dr virtual system;
  wherein the functional differentiator measures how readily a virtual system will switch from a donor to a recipient or vice versa;
  wherein a first functional differentiator value range indicates a stable virtual system, but one that does not reallocate resources well, and a second functional differentiator value range indicates a system that readily reallocates resources, but at a sacrifice in a stability of the managed computer system;
  wherein the managed computer system will be optimized when each of the plurality of virtual systems has a functional differentiator value in a third range that allows reallocation of resources without an unacceptable sacrifice in a managed system stability.

14. The program product of claim 13 wherein responsive to a determination that the managed system is partially reciprocal, instructions, for determining whether the managed system is a Do, Ro, or Do-Ro configuration; wherein responsive to a determination that the managed system is a Do, Ro, or Do-Ro configuration, instructions for changing the Ro virtual system to a Rd virtual system.

15. The program product of claim 13 wherein responsive to a determination that the managed system is partially reciprocal, instructions for determining whether the managed system is a Do, Ro, or Do-Ro configuration; wherein responsive to a determination that the managed system is a Do, Ro, or Do-Ro configuration, instructions for changing the Do virtual system to a Dr virtual system.

16. The program product of claim 13 wherein responsive to a determination that the managed system is partially reciprocal, instructions for determining whether the managed system is a Do, Ro, or Do-Ro configuration; wherein responsive to a determination that the managed system is not a Do, Ro, or Do-Ro configuration, instructions for determining whether the managed system is performing acceptably.

17. The program product of claim 16 wherein responsive to a determination that the managed system is not performing acceptably, instructions for determining whether the functional differentiator of a virtual system is large; and responsive to a determination that the functional differentiator of a virtual system is large, instructions for decreasing the functional differentiator of the virtual system.

18. The program product of claim 16 wherein responsive to a determination that the managed system is not performing acceptably, instructions for determining whether the functional differentiator of a virtual system is large; and responsive to a determination that the functional differentiator of a virtual system is not large, instructions for increasing the functional differentiator of the virtual system.

19. The program product of claim 13 wherein the determination of the reciprocity includes a determination of the configuration of the managed system; wherein responsive to a determination that a managed system is a fully reciprocal symmetric configuration, instructions for determining whether the functional differentiator of a virtual system is large;

and responsive to a determination that the functional differentiator of a virtual system is large, instructions for decreasing the functional differentiator of the viral system.

20. The program product of claim 13 wherein the determination of the reciprocity includes a determination of the configuration of the managed system; wherein responsive to a determination that a managed system is a fully reciprocal symmetric configuration, instructions for determining whether the functional differentiator of a virtual system is large; and responsive to a determination that the functional differentiator of a virtual system is not large, instructions for increasing the functional differentiator of the virtual system.

21. The program product of claim 13 wherein the determination of the reciprocity includes a determination of the configuration of the managed system; wherein responsive to a determination that a managed system is a fully reciprocal asymmetric configuration, instructions for determining whether the managed system contains a Dr virtual system; and responsive to a determination that the virtual system contains a Dr virtual system and responsive to a determination that the managed system is not performing acceptably, instructions for decreasing the donor load threshold of the Dr system.

22. The program product of claim 13 wherein the determination of the reciprocity includes a determination of the configuration of the managed system; wherein responsive to a determination that a managed system is a fully reciprocal asymmetric configuration, instructions for determining whether the managed system contains a Dr virtual system; and responsive to a determination that the virtual system contains a Dr virtual system and responsive to a determination that the managed, system is not performing acceptably, instructions for decreasing the recipient load threshold of a RD system.

23. The program product of claim 13 wherein the determination of the reciprocity includes a determination of the configuration of the managed system; wherein responsive to a determination that a managed system is a fully reciprocal asymmetric configuration, instructions for determining whether the managed system contains a Dr virtual system; and responsive to a determination that the virtual system does not contain a Dr virtual system and responsive to a determination that the managed system is not performing acceptably, instructions for increasing the recipient load threshold of a Rd system.

24. The program product of claim 13 wherein the determination of the reciprocity includes a determination of the configuration of the managed system; wherein responsive to a determination that a managed system is a fully reciprocal asymmetric configuration, instructions for determining whether the managed system contains a Dr virtual system; and responsive to a determination that the virtual system does not contain a Dr virtual system and responsive to a determination that the managed system is not performing acceptably, instructions for increasing the donor load threshold of a RD system.

25. A program product for causing a computer to optimize a dynamic logical partitioning of a managed computer system, through allocation of resources within a plurality of virtual systems in the managed computer system, based on an ability of a donor system to donate resources and a need of a recipient system to receive resources, said program product comprising:

a computer-usable medium;
wherein said computer usable medium comprises:
a performance enhancement program encoded thereon;
a classification program encoded thereon;
a system analysis program encoded thereon; and
a system evaluation program encoded thereon;
wherein the classification program comprises a first plurality of instructions, the first plurality of instructions comprising:
instructions for obtaining an average workload for each of a plurality of virtual systems in the managed computer system;
instructions for comparing the average workload a donor load threshold or a recipient load threshold for each of the plurality of virtual systems in the managed computer system;
instructions for classifying each of the plurality of virtual systems as either recipient-only (Ro), primarily recipient, but possibly donor (Rd), equally weighted as donor or recipient (RD), primarily donor, but possibly recipient (Dr), or donor-only (Do);
wherein the system analysis program comprises a second plurality of instructions, the second plurality of instructions comprising:
instructions for determining a reciprocity of a plurality of virtual systems in a managed system;
instructions for determining a symmetry of the managed system; and
responsive to the determination of reciprocity and the determination of symmetry, instructions for classifying the configuration of the managed system;
wherein the system evaluation program comprises a third plurality of instructions, the third plurality of instructions comprising:
instructions for determining the configuration of a managed system;
wherein responsive to a determination that the managed system is fully reciprocal, determining whether the managed system is performing acceptably;
wherein responsive to a determination that the managed system is performing acceptably, instructions for determining that the managed system is optimized;
wherein a virtual system is classified as an Rd system when the average workload is greater than the recipient load threshold and the virtual system can donate a resource;

wherein the virtual systems is classified as an Ro system when the average workload is greater than the recipient load threshold and the virtual system cannot donate a resource;

wherein the virtual system is classified as a Dr system when the average workload is less than the donor load threshold and the virtual system can donate a resource;

wherein the virtual system is classified as a Do system when the average workload is less than the donor load threshold and the virtual system cannot donate a resource;

wherein the virtual system is classified as a RD system when the average workload is less than or equal to the recipient load threshold and the average workload is greater than or equal to the donor load threshold;

wherein a configuration of the managed system is classified as a partially reciprocal symmetric system when the managed system contains both a Ro virtual system and a Do virtual system;

wherein the configuration of the managed system is classified as a partially reciprocal asymmetric system when the managed system contains a Ro virtual system or a Do virtual system, but not both;

wherein the configuration of the managed system is classified as a fully reciprocal symmetric system when the managed system contains only a RD virtual system;

wherein the configuration of the managed system is classified as a fully reciprocal symmetric system when the managed system contains both a Rd virtual system and a Dr virtual system;

wherein the configuration of the managed system is classified as fully reciprocal asymmetric system when the managed system contains both a Rd virtual system and a Dr virtual system;

wherein a functional differentiator measures bow readily a virtual system will switch from a donor to a recipient, or vice versa;

wherein a first functional differentiator value range indicates a stable virtual system, but one that does not reallocate resources well, and a second functional differentiator value range indicates a system that readily reallocates resources, but at a sacrifice in a stability of the managed computer system; and wherein the managed computer system will be optimized when each of the plurality of virtual systems has a functional differentiator value in a third range that allows reallocation of resources without an unacceptable sacrifice in a managed system stability.

* * * * *